Aug. 5, 1958     A. L. HORELICK     2,846,657
ELECTRICAL WINDING
Filed Aug. 27, 1956

INVENTOR.
Arnold L. Horelick
BY
Lee H. Kaiser
Attorney

United States Patent Office 2,846,657
Patented Aug. 5, 1958

2,846,657

ELECTRICAL WINDING

Arnold L. Horelick, Bridgeville, Pa., assignor to McGraw-Edison Company, a corporation of Delaware Application August 27, 1956, Serial No. 606,336

4 Claims. (Cl. 336—180)

This invention relates to stationary induction apparatus and particularly to electrical windings for stationary induction apparatus.

Mechanical forces exist between two conductors carrying electrical current proportional to the product of the currents and inversely as their distance apart. Such mechanical forces exist in a transformer since current carrying conductors are close together. These forces are small when the transformer is normally loaded, but under short circuit conditions very heavy mechanical stresses tend to separate the coils in a direction normal to their faces, i. e., axially, and in a direction parallel to their faces, i. e., radially. For example, if 25 times full load current flows in each winding of the transformer on short circuit, the mechanical stresses are 25×25=625 times normal stress. The force between two concentric coils may be represented by a radial component tending to push the coils apart and an axial component tending to slide them past each other. The radial force on the inner coil is toward the center, and is therefore one of compression. The radial force on the outer coil is away from the center and is therefore one of tension. These radial forces are resisted by the conductors in the winding. In the conventional disk coil the axial forces are only resisted by friction between the conductor turns and by the insulation provided between adjacent disk coils.

It is an object of the invention to provide an improved electrical winding wherein the axial forces are resisted by the conductors in the winding.

It is a further object of the invention to provide an improved electrical winding for stationary induction apparatus which exhibits greater strength against distortion under short circuit conditions than prior art windings.

It is another object of the invention to provide an electrical winding which prevents displacement of the conductor turns due to axial stresses produced by short circuit currents and which also augments the convection flow of liquid dielectric through the winding.

These and other objects and advantages of the invention will be apparent from the following description when taken in conjunction with the accompanying drawing wherein.

Figure 1:
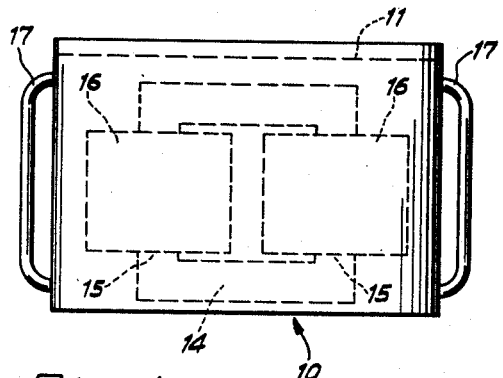
Fig. 1 is an elevation view of an electrical transformer having the improved electrical winding construction of the invention.
Figure 2:
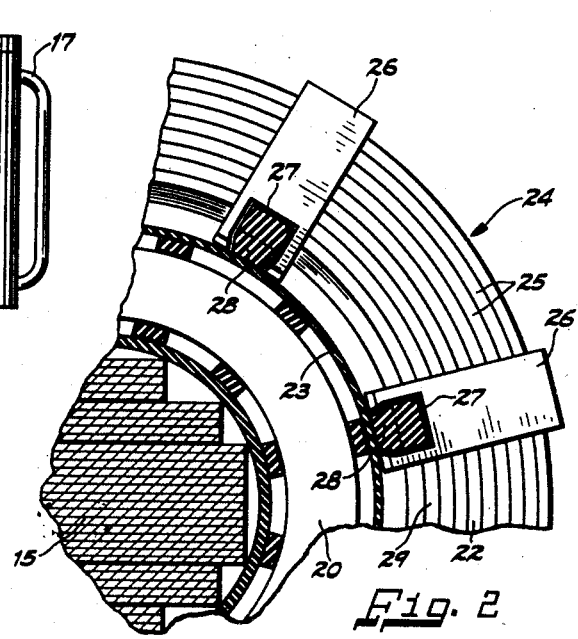
Fig. 2 is a fragmentary transverse sectional view through the transformer of Fig. 1 showing the improved electrical winding of the invention.

The improved winding construction of the invention may be utilized in electrical transformers of the type illustrated in Fig. 1 wherein a casing 10 filled with liquid dielectric 11 encloses a transformer core and coil assembly immersed in the liquid dielectric 11 and including a closed, laminated, magnetic core 14 having winding legs 15 surrounded by electrical windings 16. External radiating tubes 17 registering with the casing 10 adjacent the upper and lower ends thereof provide a circulating path for the convection flow of the liquid dielectric 11 heated by the coils 16, and the dielectric 11 is cooled by the flow of air over the external surfaces of the tubes 17. As shown in the fragmentary transverse sectional view of Fig. 2 through the core and coil assembly, the core winding legs 15 are of cruciform cross section and are surrounded by cylindrical windings 16 each of which may comprise a low voltage winding 20 and a high voltage winding 22 radially outward therefrom, or vice versa. A tubular insulating barrier 23 separates the low voltage winding 20 from the high voltage winding 22. The high voltage winding 22 may comprise a plurality of axially spaced apart, dished layers 24 of conductor turns 25. The dished layers 24 may be either of the pancake type, wherein a single conductor of rectangular cross section is wound spirally outward, or it may be of the helical type wherein a plurality of electrical conductors are simultaneously wound.

The dished layers 24 are separated by circumferentially spaced apart insulating spacers 26 extending radially between the layers 24. Each radial spacer 26 is provided with a bayonet slot 27 permitting interlocking in the conventional manner with axial spacers 28 disposed between the insulating barrier 23 and the radially inner turns 29 of the dished layers 24. The liquid dielectric 11 in which the core and coil assembly is immersed may thus flow between the tubular insulating barrier 23 and the inner edges of the dished coils 24 as well as through the ducts between the dished layers 24 which are spaced apart by the radial spacers 26.

Figure 3:
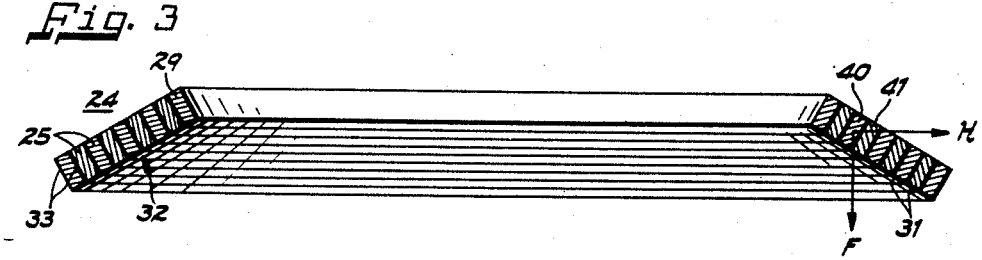
Fig. 3 is a vertical sectional view through a dished pancake coil embodying the invention.

In the improved winding construction of the invention the layers 24 are dished upwardly as shown in Fig. 3 and the conductors 25 thereof are preferably of rectangular cross section. In any radial cross section through the dished layers 24, the shorter faces 31 of all the rectangular-in-cross-section conductors 25 are in alignment and provide an upwardly inclined guiding surface 32 at an angle to the axis of the cylindrical winding 15 for directing the upward convection flow of liquid dielectric 11 between the radial spacers 26. The longer faces 33 of all of the rectangular-in-cross-section conductors 25 are inclined obliquely to the vertical axis of the cylindrical winding 15.

When a conventional disk type winding having all of the conductor turns in a horizontal plane carries short circuit current, the forces due to attraction and repulsion acting on any conductor have a radial component tending to increase the turn length and an axial component tending to displace that turn relative to adjacent turns. The horizontal, or radial, forces tending to cause the individual turn to increase its length causes that turn to bear against the adjoining turn, and thus the radial forces are resisted by the conductors in the winding. On the other hand the axial forces tending to displace the turns are resisted only by the friction between turns and by insulating material disposed between the pancake coils.

In the improved winding construction of the invention, any force tending to separate turns 25 in a direction parallel to the axis of winding 16 is resisted by interference between the turns. In other words, the turns 25 overlap in an axial direction and each turn 25 is in the path of axial movement of an adjacent turn and physically obstructs movement of the latter in an axial direction. Considering the two adjacent rectangular-in-cross-section turns 40 and 41 of Fig. 3, it will be apparent that the turns 40 cannot move axially downward in the direction of the axial force component F because the turn 41 is in the path of and obstructs such movement. In order to permit the turn 40 to move vertically downward in the direction of axial force component F, either the turn 40 must be decreased in length or the turn 41 increased in length. It will thus be apparent that the conductors in the winding of the invention resist axial forces, and that consequently greatly improved strength resisting separation of the conductor turns in a direction parallel to the axis of the electrical winding is achieved. The improved winding construction of the invention also provides substantially the same resistance to distortion under radial forces as conventional pancake, or disk, type coils. For example, when turn 40 carries short circuit current, turn 40 bears against turn 41 due to the horizontal component H of the short circuiting forces, and the strength of the two turns 40 and 41 against distortion in the horizontal plane is increased.

Figure 4:
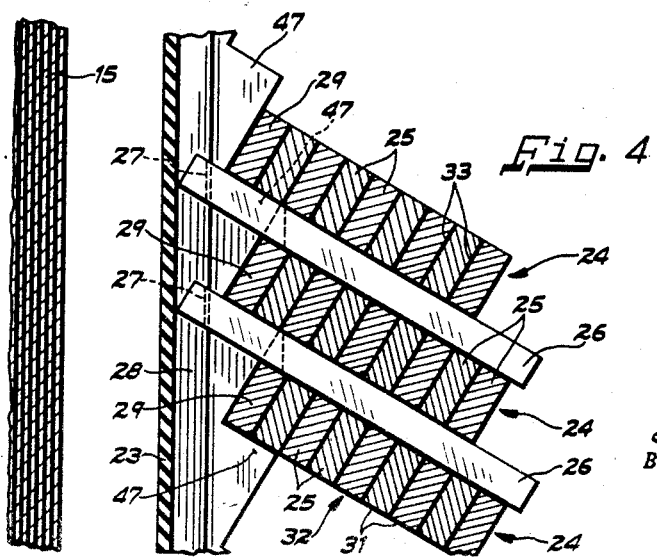
Fig. 4 is a view of a fragment of the transformer of Fig. 1 showing, in section, one embodiment of the winding construction of the invention.

The embodiment of winding construction illustrated in Fig. 4 provides still greater resistance to separation of the turns in an axial direction. A stepped insulating support is provided for the inner turn 29 of each of the dished layers 24 to prevent movement of inner turn 29 in an axial direction. In the illustrated embodiment each axial spacer 28 disposed between the tubular insulating barrier 23 and the coils 24 is provided with a sawtooth contour on the radially outer face thereof, and the radially inner turn 29 of each dished coil 24 is accommodated between the tooth-like projections 47 on the axial spacers 28 and thus supported against movement parallel to the axis of winding 15. It will be appreciated that inasmuch as the conductor turns 25 of each dished layer 24 mutually interfere and prevent separation of the turns in an axial direction, and further that the radially inner one 29 of the turns 25 is supported by the tooth-like projections 47 against movement in an axial direction, the embodiment of Fig. 4 achieves still greater strength against distortion due to the axial components of the short circuit forces. It will be appreciated that the support for the inner turn 29 of each dished layer 24 can take other forms than the tooth-like projections 47 and can be provided in other insulating members than the axial spacers 28.

It will be appreciated that the improved results of the winding construction of the invention are also achieved in transformers having forced oil circulation as well as in transformers insulated with a gaseous dielectric.

Although only a few embodiments of the improved winding construction of the invention have been described and illustrated, it will be appreciated that other modifications and variations thereof will be apparent to those skilled in the art, and consequently it is intended in the appended claims to cover all such variations and modifications as fall within the true spirit and scope of the invention.

What I claim is:

1. Stationary induction apparatus comprising, in combination, a magnetic core having a winding leg, an electrical winding including a plurality of coaxially spaced apart layers of conductor turns surrounding said leg, each of said conductors having a rectangular cross section and being disposed with the longer faces of the rectangle inclined at an acute angle to the axis of said winding, each of said layers being dished so that in any radial cross section through said layer the shorter of the rectangular faces of said conductors are in alignment and provide an upwardly inclined surface for guiding dielectric coolant through said winding, adjacent ones of the side-by-side turns in any layer interfering and resisting displacement thereof parallel to the winding axis when short circuit forces act on the winding in a direction parallel to the winding axis.

2. Stationary induction apparatus comprising, in combination, a casing, liquid dielectric within said casing, a core and coil assembly immersed in the liquid dielectric within said casing including a magnetic core having a winding leg and an electrical winding having a plurality of coaxially spaced layers of conductor turns in side-by-side relation surrounding said winding leg, said conductors being of rectangular cross section and having the longer faces of the rectangle inclined obliquely to the axis of said winding, each of said layers being dished upwardly and the shorter of the rectangular faces of said conductors being in alignment in any radial cross section through said layer, whereby adjacent ones of the side-by-side turns in any layer interfere and prevent movement of said turns in an axial direction under forces produced by short circuit currents flowing through said turns.

3. Stationary induction apparatus comprising, in combination, a magnetic core having a winding leg, an electrical winding including a plurality of coaxially spaced apart layers of conductor turns surrounding said winding leg, each of the conductors having a rectangular cross section and the longer faces of the rectangle being inclined obliquely to the axis of said winding, each of said layers being dished and the shorter faces of all the rectangular-in-cross-section conductors in each said layer being in alignment in any radial cross section through said layer, and insulating means disposed between said winding leg and said layers and providing a stepped support accommodating the radially inner turn of each of said layers and preventing movement thereof in an axial direction, adjacent ones of the side-by-side turns in any layer interfering and resisting displacement thereof in a direction parallel to the axis of said winding under short circuit forces acting on the winding in a direction parallel to the axis of said winding.

4. In stationary induction apparatus, in combination, a casing, insulating dielectric within said casing, a core and coil assembly immersed in said dielectric within said casing including a laminated magnetic core having a winding leg and an electrical winding having a plurality of coaxially spaced layers of conductor turns in side-by-side relation surrounding said winding leg, the conductors being of rectangular cross section and disposed with the longer faces of the rectangle inclined obliquely to the axis of said winding and with the conductors in a common plane in any radial cross section through said layers, a plurality of insulating axial spacers between said winding leg and the radially inner turns of said layers extending parallel to the axis of said winding, a plurality of circumferentially spaced apart insulating spacers extending radially between each pair of adjacent layers and engaging said axial spacers, said axial spacers providing means to support the radially inner conductor turn of each of said layers against movement in a direction parallel to the axis of said cylinder, adjacent ones of the side-by-side turns in any layer interfering and resisting displacement thereof in a direction parallel to the axis of said winding under short circuit forces acting on the winding.

References Cited in the file of this patent

UNITED STATES PATENTS

| 1,183,616 | Wooldridge | May 16, 1916 |
| 2,467,804 | Beymer | Apr. 19, 1949 |

FOREIGN PATENTS

| 148,597 | Switzerland | Oct. 1, 1931 |